(12) United States Patent
Koodli et al.

(10) Patent No.: US 7,000,120 B1
(45) Date of Patent: Feb. 14, 2006

(54) SCHEME FOR DETERMINING TRANSPORT LEVEL INFORMATION IN THE PRESENCE OF IP SECURITY ENCRYPTION

(75) Inventors: Rajeev Koodli, Natick, MA (US); Senthil Sengodan, Woburn, MA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/471,083

(22) Filed: Dec. 23, 1999

(51) Int. Cl.
*G06F 11/30* (2006.01)

(52) U.S. Cl. .................................. 713/201; 713/153
(58) Field of Classification Search ................ 713/201, 713/153, 160, 154; 370/389, 473, 392
See application file for complete search history.

(56) References Cited

U.S. PATENT DOCUMENTS

| | | | |
|---|---|---|---|
| 5,825,891 A | | 10/1998 | Levesque et al. |
| 5,958,053 A | * | 9/1999 | Denker ........................ 713/201 |
| 6,084,855 A | * | 7/2000 | Soirinsuo et al. ............. 370/235 |
| 6,460,137 B1 | * | 10/2002 | Akiyama et al. ............. 713/160 |

OTHER PUBLICATIONS http://cr.yp.to/syncookies.html.*
http://cr.yp.to/syncookies/archive.*
S. Kent et al, "Security Architecture for the Internet Protocol", Request for Comments (RFC) 2401, Networking Group, Internet Engineering Task Force (IETF), Nov. 1998, pp. 1–58.
R. Pereira, et al, "The ISAKMP Configuration Method", Internet Draft Internet Engineering Task Force IP Security Working Group Aug. 1999, pp. 1–13.
R. Atkin, et al, "IP Encapsulating Security Payload (ESP)", Network Working Group Request for Comments: 2406 Obsoletes: 1827, Nov. 19, 1999, pp. 1–23.
L. Sanchez, et al, "Security Policy Protocol", Internet Draft, Aug. 31, 1999, pp. 1–64.
R. Pereira, et al, "Extended Authentication within ISAKMP/Oakley", Internet Engineering Task Force IP Security Working Group Internet Draft, Aug. 31, 1999, pp. 1–14.
L. Sanchez, et al, "Security Policy System", Network Working Group Internet Draft, Aug. 31, 1999, pp. 1–64.
J. Jason, et al, "IPsec Policy Schema", Internet Engineering Task Force Internet Draft, Aug. 31, 1999, pp. 1–12.

* cited by examiner

*Primary Examiner*—Gregory Morse
*Assistant Examiner*—Andrew L Nalven
(74) *Attorney, Agent, or Firm*—Antonelli, Terry, Stout & Kraus, LLP

(57) ABSTRACT

A method and apparatus which permits access, by intermediate nodes between source and destination nodes, to selected information such as transport level information, normally included in a payload of a packet upon which encrypting security processing has been performed according to an encrypting security protocol. In the present invention, prior to performing encrypting security processing on the packet, according to the security protocol, information related to selected information normally included in a payload of the packet is stored in a field in the header of the packet where the field is not subject to the encrypting security processing. Thereafter, encrypting security processing according to the security protocol is performed on the packet. The packet including the header having stored therein information corresponding to the selected information normally included in the payload and the payload upon which encrypting security processing has been performed is then transmitted on the packet switched network to its destination. Since the information related to the selected information normally included in the payload of the packet is stored in the header of the packet, access to the selected information by the intermediate nodes between source and destination nodes in a packet switched network is possible.

24 Claims, 3 Drawing Sheets

| ab | TRANSPORT PROTOCOL |
|---|---|
| 00 | ICMP |
| 01 | UDP |
| 10 | TCP |
| 11 | UNDEFINED |

FIG. 4B

| cdefgh | A | S_PORT | D-PORT |
|---|---|---|---|
| 000000 | 1 | 1050 | 857 |
| 000001 | 1 | 880 | 857 |
| 000010 | 1 | 2240 | 80 |
| 000011 | 0 | | |
| 000100 | 1 | 1769 | 21 |
| 000101 | 0 | | |
| 000110 | 0 | | |
| 111110 | 1 | 78 | 57 |
| 111111 | 1 | 136 | 753 |

SCHEME FOR DETERMINING TRANSPORT LEVEL INFORMATION IN THE PRESENCE OF IP SECURITY ENCRYPTION

BACKGROUND OF THE INVENTION

The present invention relates to a method and apparatus for permitting access to information contained in selected fields of a packet subjected to security processing, particularly by intermediate nodes between source and destination nodes when the packet is transmitted on a packet switched network from the source node to the destination node.

In packet switched networks, packets are transmitted between nodes connected to the network to effect communication between the nodes. Information in the packets may include messages and commands such as a request for service, connection management controls, or data. The packets transmitted on the packet switched network are transmitted according to, for example, the Internet Protocol (IP) which defines how to format various information in the packets for transmitting on the packet switched network. Currently, the IP is defined according to IPv4 where the "v4" indicates version 4 of the Internet Protocol, and IPv6 where the "v6" indicates version 6 of the Internet Protocol.

Security across the packet switched network is afforded by IP Security Protocol (IPsec) as set forth in "Security Architecture for the Internet Protocol", by S. Kent et al, Request for Comments (RFC) 2401, Networking Group, Internet Engineering Task Force (IETF), November 1998. IPsec is a protocol designed to provide various security services for traffic at the IP layer and upper layer protocols in both the IPv4 and IPv6 environments.

These security services are implemented through the use of two traffic security protocols, namely, Authentication Header (AH) Protocol, and Encapsulating Security Payload (ESP) Protocol and through the use of Cryptographic Key Management Procedures and Protocols. The set of IPsec Protocols employed in any context, and the ways in which they are employed, are determined by the security and system requirements of users, applications and/or sites/organizations.

The AH protocol provides security services of connection list integrity, data origin authentication and anti-replay. The ESP protocol provides security services of confidentiality (encryption), and limited traffic flow confidentiality. The ESP protocol can also provide security services of connection list integrity, data origin authentication and anti-replay. These protocols may be applied alone or in combination with each other to provide a desired set of security services in IPv4 and IPv6. When either of these protocols are used, particularly security processings are performed. Each protocol supports two modes of use: Transport Mode and Tunnel Mode. In the Transport Mode the protocols provide protection primarily for upper layer protocols. In the Tunnel Mode the protocols are applied to tunneled IP packets.

Both AH and ESP make use of Security Associations (SAs). An SA is a simplex "connection" that affords security services to the traffic carried by it. An SA is uniquely identified by a triple including a destination IP address, a Security Protocol (AH or ESP), and a Security Parameter Index (SPI). The endpoints of an SA can, for example, be a pair of hosts, a pair of security gateways or a security gateway and a host. The security gateway can, for example, be a router, a firewall, etc. When either end or both ends of an SA are a security gateways then the tunnel mode is used.

Prior to the use of the above described security protocols, an SA must be established. Thus, for example, prior to use of the ESP protocol between, for example, two hosts, an SA, identified according to the triple described above, must be established between the pair. When the ESP protocol is used, the entire IP packet, with the exception of the IP header, the AH protocol header if present and the ESP header, is encrypted during packet transmission as illustrated by the shaded areas in FIG. 1.

Figure 1:
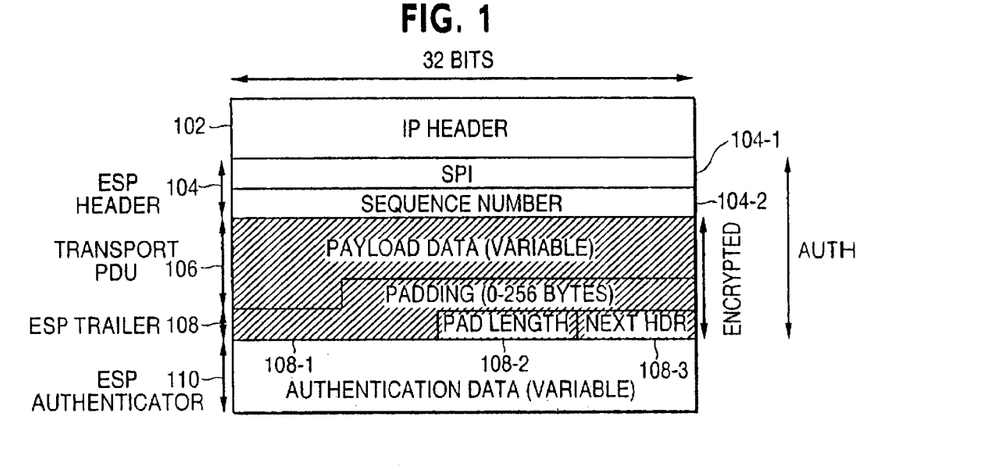
FIG. 1 is a schematic diagram illustrating the configuration of an IP packet when the ESP protocol is used.

As illustrated in FIG. 1, the IP packet which has been subjected to security processings according to the ESP protocol includes an IP header 102, an ESP header 104, a transport PDU (Payload Data Unit) 106, an ESP trailer 108 and an ESP authenticator 110. The ESP header 104 includes an SPI field 104-1 and a sequence number field 104-2. The transport PDU 106 includes payload data which can be of variable length, and the ESP trailer 108 includes a padding field 108-1, a padding length field 108-2 and a next header identifier field 108-2. The payload data can include, for example, transport level information including Transmission Control Protocol (TCP) Header, User Datagram Protocol (UDP) Header or Internet Control Message Protocol (ICMP) Header and port number. The sequence number contained in the sequence number field 104-2 of the ESP header is a 32-bit monotonically increasing number that is present to prevent replay attacks. Since the payload data 106 and the ESP trailer 108 are encrypted according to the security processing effected by, for example, the ESP protocol the only information visible to any intermediate nodes between the source and destination of the SA (including the first-hop-ingress-egress routers) would be the IP header 102, the ESP header 104 and the ESP authenticator 110.

Although not illustrated, an IP packet subjected to security processings according to the AH protocol in addition to ESP, when used, causes the same problems as when the ESP protocol above is used. Namely, the entire transport payload including the transport headers is encrypted. Therefore, an IP packet subjected to security processings according to the AH and ESP protocol would have a configuration similar to that illustrated in FIG. 1 with the exception that the AH header would be present as well.

The security processing, particularly encryption, of selected information in selected fields especially the transport level information including the transport protocol and the port number, is undesirable for certain intermediate nodes such as, for example, packet classifier/marker nodes providing differentiated services, policing nodes such as firewalls, or management nodes for metering. For example, if the ingress router also serves the function as a packet classifier/marker node providing differentiated services, this router will not be able to access the transport level information, such as transport protocol and port number that may used as indicators for indicating the type of service desired according to the differentiated services framework. For example, a TCP destination port number of 80 may indicate access to a webserver, which could be used to classify and mark the Differentiated Services Code Point (DSCP) in the packet for an appropriate treatment for web related services. This type of classification and marking known as multi-field classification (and marking) and differentiated services (DIFFserv) would not be possible if ESP is used as described above.

Therefore, there is a need to provide selected field accessibility for certain intermediate nodes in the presence of, for example, security processing of an IP packet without compromising the security of the system nor requiring modifications to the existing protocols.

SUMMARY OF THE INVENTION

The present invention provides a method and apparatus for permitting access to selected information in selected fields of a packet, which has been subjected to security processing, by intermediate nodes in a packet switched network when the packet is being transmitted on the packet switched network.

Particularly, the present invention provides a method and apparatus which permits access to selected information such as transport level information, normally included in a payload of a packet upon which encrypting security processing has been performed according to a security protocol by a node in a packet switched network during transmission of the packet.

The present invention accomplishes the above by prior to performing security processing according to an encrypting security protocol on a packet, storing information related to selected information normally included in a payload of the packet in a header of the packet. The field in the header that this information is placed is not subjected to the encrypting security processing. Thereafter, the security processing is performed on the packet. The packet including the header having stored therein information corresponding to the selected information normally included in the payload and the payload upon which security processing has been performed is then transmitted on the packet switched network to its destination.

Therefore, according to the present invention, by storing information related to the selected information normally included in the payload of the packet in the header of the packet as well, access to the selected information by intermediate nodes between the source and destination nodes in a packet switched network is possible. The information related to the selected information normally included in the payload of a packet can, for example, be representative of the selected information or the selected information itself. The information related to the selected information can be freely accessed by the intermediate nodes, decoded if necessary, and used to initiate specified processings on the packet by the intermediate node.

The present invention is particularly applicable to the security services provided by the IP Security (Ipsec) Protocol, wherein the Encapsulating Security Payload (ESP) protocol is used. Implementing ESP on an IP packet requires that portions of the IP packet, particularly the payload of the IP packet, which includes transport level information such as transport protocol and port number, be encrypted during transmission. Encrypting portions of the IP packet, particularly the payload of the IP packet eliminates access by intermediate nodes to the transport level information contained in the encrypted portions of the IP packet when the IP packet is transmitted between source and destination nodes on a packet switched network.

The present invention allows for access of the transport level information contained in the encrypted portions of the IP packet during transmission of the IP packet by storing information related to the transport level information in the security protocol header of the IP packet. The information selected to the transport level information could, for example, be stored in the sequence number field of the security protocol header of the IP packet. Intermediate nodes in the packet switched network can easily access such information since it is part of the security protocol header which is not encrypted according to security processings effected on the IP packet according to the encrypting security protocol.

BRIEF DESCRIPTION OF THE DRAWINGS

The present invention will be more apparent from the following detailed description, when taken in conjunction with the accompanying drawings, in which.

DETAILED DESCRIPTION OF THE INVENTION

The present invention will be described relative to FIGS. 1, 2a–c, 3, 4a–b, and 5a–c. It should noted that the present invention is not limited to the embodiments illustrated in these figures and other embodiments recognizable by those of ordinary skill in the art are encompassed within the scope of the present invention.

The present invention is intended to operate in a packet switched network where security services according to IPsec ESP are provided. These security services effected by security processings performed according to the ESP protocol of the IPsec is initiated once a Security Association (SA) has been established. A SA is a simplex "connection" that affords security services to the traffic carried by it. A SA is uniquely identified by a triple including a destination IP address, security protocol (AH or ESP), and a Security Parameter Index (SPI). The endpoints of a SA can, for example, be a pair of hosts, a pair of security gateways or a security gateway and a host. The security gateway can, for example, be a router, a firewall, etc.

Figure 2A:
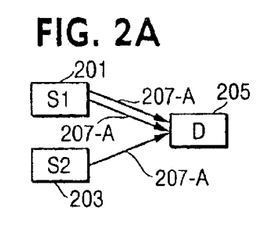
FIGS. 2a–c are schematic diagrams illustrating different scenarios for Security Associations.
Figure 2B:
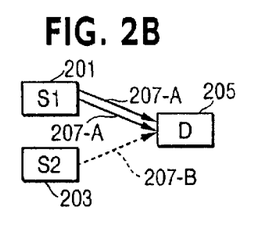
Figure 2C:
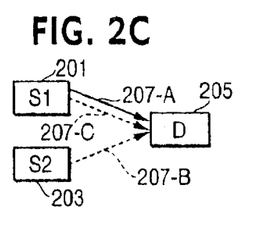

FIGS. 2a–c illustrate examples of scenarios for the establishment of SAs. Each figure illustrates an SA including two sources, source 1 (SI), 201 and source 2 (S2), 203, one destination 205 and 3 SAs 207. Each SA 207 of each figure terminates at the same destination 205.

As illustrated in FIG. 2a, the SAs established between S1 201 and the destination 205 and S2 203 and the destination 205 are all identical as per the solid line arrows. Particularly, between S1 201 and destination 205 two identical SAs 207-A are established and between S2 203 and destination 205 a single SA 207-A identical, as per the solid line arrow, to the SAs established between S1 201 and destination 205 is established.

FIG. 2b illustrates a case where the two SAs 207-A established between S1 201 and destination 205 are identical as per the solid line arrows. An SA 207-B established between S2 203 and destination 205 is different as per the dashed line arrow, from the SAs 207-A established between the S1 201 and the destination 205.

FIG. 2c illustrates a case where all SAs established between the sources S1 201 and S2 203 and the destination 205 are different from each other. Namely, between S1 201 and the destination 205 an SA 207-A is established as per the solid line arrow and a different SA 207-C is established as per the dotted line arrow. Further, between the S2 203 and the destination 205, a SA 207-B different from the SA 207-A and SA 207-C, as per the dashed line arrow is established.

As per FIGS. 2a-c, the choice of identifying an SA lies with the receiver (destination). Since the SA is uniquely identified by the triple destination IP address, security protocol and SPI, the destination is required to consider certain issues while determining whether a SA is unique or distinct. For example, when the security protocol (AH, ESP) is different, then the SA established between the source and destination is different. However, two SAs that terminate at the same destination and use different security protocols can, for example, use identical SPIs. Further, two SAs that terminate at the same destination and which use the same security protocol may be either identical or distinct. In this situation, the SA would be identical if the respective SPI values are identical. Otherwise, the SAs in this situation would be different. A destination must use different SAs if the security processing namely, encryption algorithm, key links, key value, etc., is different. If the security processing is identical then the destination may use identical SAs. However, the destination may use different values for the SA if it so desires.

In the conventional technique, once an SA has been established and security processings according to the ESP protocol (and optionally AH) has been initiated, the IP packet being transmitted on the packet switched network is entirely encrypted with the exception of portions or all of the IP header and the security protocol (AH or ESP) header. Such a packet is illustrated, for example, in FIG. 1 relative to the ESP protocol. As shown in FIG. 1, the transport PDU 106 and the ESP trailer 108 are fully encrypted whereas the IP header 102, the ESP header 104 and the ESP authenticator 110 are not encrypted. The encrypted areas are shown by the shading.

The conventional technique as described above, suffers from numerous disadvantages one of which being that selected information in selected fields of the IP packet are encrypted, thereby causing such information to be inaccessible to intermediate nodes which may use such selected information to transmit or perform other processings on the packet. This now inaccessible information could, for example, be transport level information which is used by the intermediate nodes to provide, for example, differentiated services, policing or metering. The transport level information includes, for example, transport protocol information including TCP, UDP and ICMP and port number information. The transport level information is normally carried in the payload data portion of an IP packet. The inaccessibility of such information normally carried in the payload portion of an IP packet does not permit the intermediate nodes between the source and destination nodes in a packet switched network to perform such value added services relative to the communication.

The present invention overcomes the above by permitting access to selected information normally included in the payload of a packet upon which encrypting security processing has being performed. Such is accomplished in the present invention by, for example, placing information related to the selected information in the security protocol header of the IP packet. This operation is conducted prior to security processing being performed on the packet according to the security protocol being used. The information related to the selected information could, for example, be representative of the selected information or the selected information itself. The selected information could, for example, be transport level information including transport protocol and port number information. The information related to the selected information stored in the security protocol header is stored along with information identifying the security protocol. After the above described storing operation, security processing is performed on the packet and the packet is transmitted to its destination on the packet switched network. Since information related to the selected information is now contained in the security protocol header of the packet which is not encrypted, such information is readily accessible by intermediate nodes in the packet switched network existing between source and destination nodes.

According to the present invention, the sequence number field of the security protocol header can be used to convey information related to the selected information when security processing has been performed and the packet is being transmitted. Other fields of the security protocol header or the IP header could possible be used. The present invention is not limited to use of the sequence number field. The present invention provides a modified security protocol header specifically modifying the sequence number field 104-2. The sequence number field 104-2 is modified to include information related to the selected information normally contained in the encrypted payload portion of the packet when security processing has been performed. The sequence number field 104-2 of the security protocol header, particularly the ESP header illustrated in FIG. 1, is 32 bits long and can be configured such as that illustrated in FIG. 3.

Figure 3:
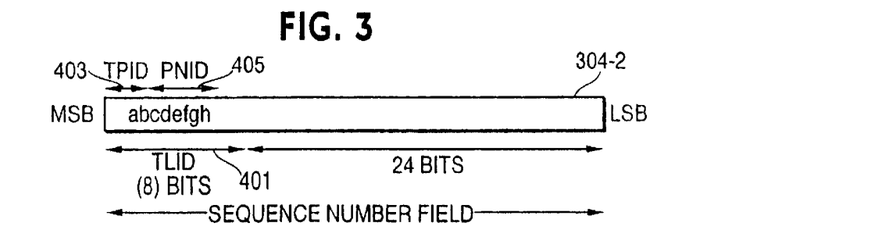
FIG. 3 is a schematic diagram illustrating the sequence number field of the IP packet when the ESP protocol is used according the present invention.

As illustrated in FIG. 3, the leading 8 bits of the sequence number field 104-2 could be used to provide information related to the transport level information of the packet with the remaining 24 bits being used, for example, to provide information regarding the sequence number. While the specific number of bits of the sequence number field assigned to be used to provide information related to the transport level information may vary, it is important that knowledge of the scheme used be provided to each of the intermediate nodes of an established SA.

Specifically, an intermediate node that requires access to such information related to the transport level information needs to be aware of the mechanism employed by the source node of the SA to represent such information in the sequence number field of the security processing header of the packet. Several mechanisms are possible by which an intermediate node may be informed of the specific number and uses of the leading bits of the sequence number field to represent the transport level information. These mechanisms can include, for example, standardizing the number and usage of the bits so that any intermediate node need merely to refer to predetermined (protocol) standard interpretations. Also the source node of the SA may indicate the number and usage of these bits to an intermediate node by communications which can be performed on or off line. The present invention as illustrated, for example, in FIG. 3 provides a particular mechanism. However, the present invention is not limited to such a mechanism.

In FIG. 3, a Transport Level ID (TLID) 401 is provided. The TLID 401 includes a plurality of leading bits of the sequence number field 104-2. The TLID 401 includes a Transport Protocol ID (TPID) 403 and a Port Number ID (PNID) 405. The TPID 403 and the PNID 405 are each formed by a plurality of bits, the total of which are equal to the bits used for the TLID 401. In the present invention as illustrated in FIG. 4, the TPID 403 comprises two bits (a, b) and the PNID 405 comprises six bits (c–h).

The TPID 403 identifies the particular transport protocol (TCP, UDP, ICMP, etc.)used and the PNID identifies the associated port number. It should be noted that the exact number of bits used for the each of the TPID 403 and PNID 405 can be different from that illustrated in FIG. 3. The present invention is not limited to the embodiment described above.

Figure 4A:
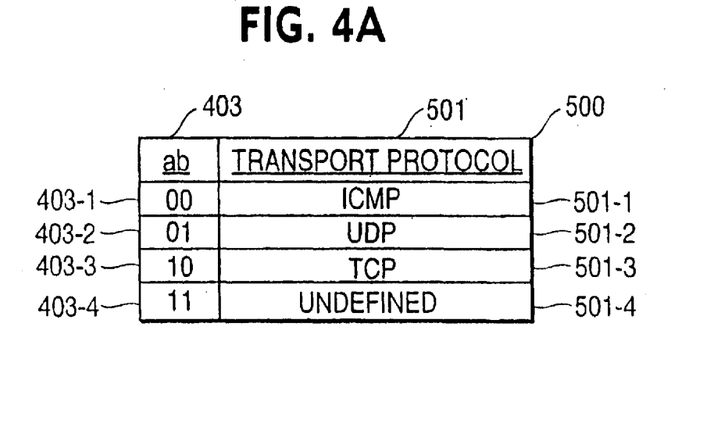
FIGS. 4a and b are tables illustrating the values of various bits of the sequence number field of an IP packet configured according to the present invention.

The present invention provides a Transport ID Mapping Table 500 as illustrated in FIG. 4a providing information indicating corresponding relations between the TPID 403 and the transport protocol 501. In the table, the TPID 403, including bits a and b, identifies the particular transport protocol 501 which forms part of the transport level information. The transport protocol 501 could, for example, include ICMP 501-1 corresponding to TPID bits "00" 403-1, UDP 501-2 corresponding to TPID bits "0" 403-2, TCP 501-3 corresponding to TPID bits "10" 403-3 and undefined 501-4 corresponding to TPID bits "11" 403-4.

Figure 4B:
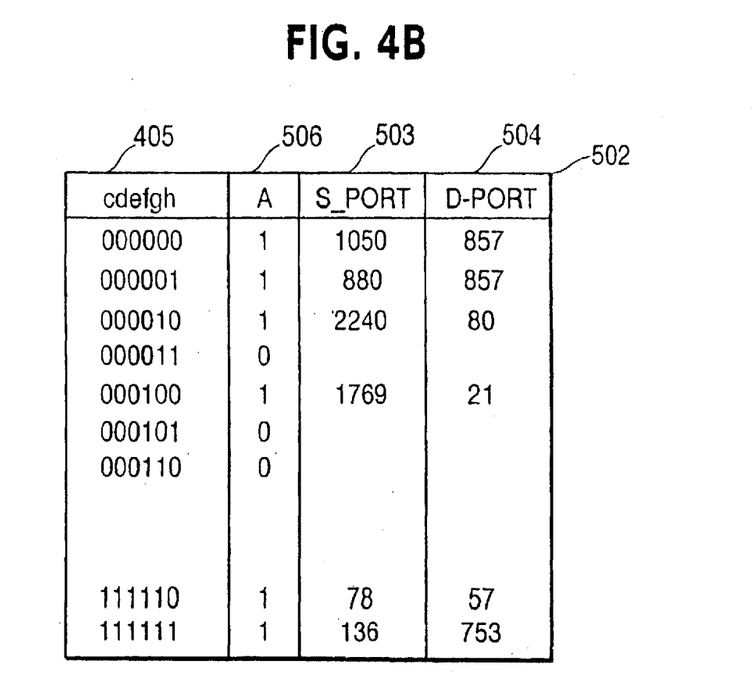

The present invention also provides a Port Number ID mapping table 502 as illustrated in FIG. 4b providing information indicating corresponding relations between the PNID 405 and port numbers. In the table, the PNID 405 can be used to identify either a source port number 503, a destination port number 504 or both. A flag A 506 is provided to indicate whether a particular bit sequence of the PNID 405 has been assigned to a flow of packets (A=1) or not to any flow of packets (A=0).

Figure 5A:
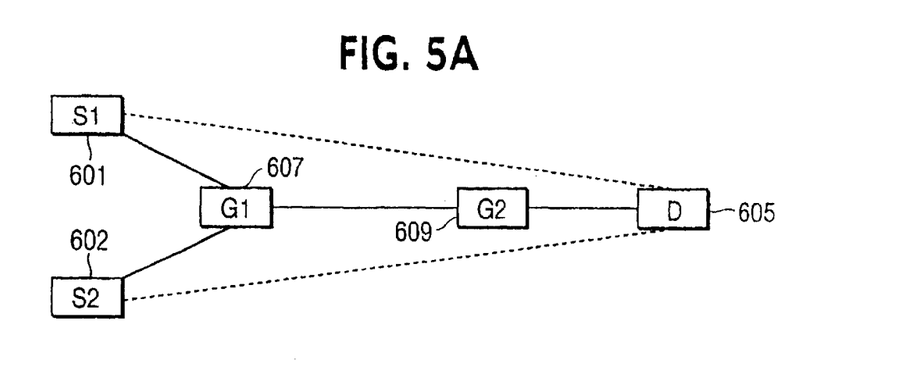
FIGS. 5a–c are schematic diagrams illustrating various modes of operation relative to the ESP protocol according the present invention.
Figure 5B:
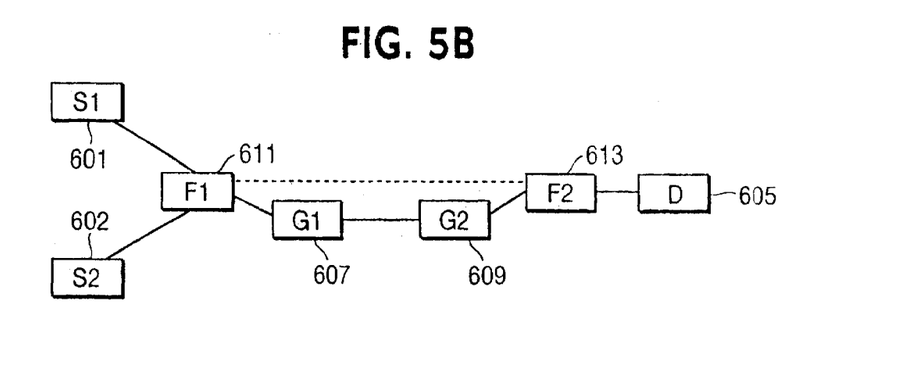

The tables illustrated in FIGS. 5a and b can be provided, for example, by the source node of the SA to the intermediate nodes existing between the source node of the SA and the destination node of the SA. Any of the mechanisms described above for accomplishing this can also be used. These tables are stored in the intermediate nodes for use in decoding the information conveyed by the leading bits of the sequence number field of the security protocol header of an IP packet. The mapping of the values illustrated as being contained in these tables, as provided to any one of the intermediate nodes, is performed, for example, by the source node of a SA.

The mapping of the values of the tables illustrated in FIGS. 4a and b can, for example, be unique for a triple including a source IP address, a destination IP address and an SPI. Inclusion of the source IP address in this triple permits the creation of a mapping locally within the source of an SA without the need for consulting other sources that may share the SA. It should be noted that SPI in the above noted triple corresponds to the SPI in, for example, the ESP header but not to the SPI in, for example, the AH header. The SPI of the AH header may also be present in the same IP packet. In other words, the security protocol field is implicit in the triple with a constant value of ESP. When a new six bit value needs to be assigned to a new flow of packets, the source of the SA may utilize any available value between 0 and 63.

Since the mapping is unique to a triple including a source IP address, a destination IP address and an SPI, the session/flow is uniquely identified by a triple including the source IP address, the destination IP address, the SPI and the PNID. Here the PNID refers to a portion of the leading bits of the sequence number field of a packet configured according to the present invention.

It is possible that if the same SA is used for several simultaneous sessions between the same source and destination pair, the Port Number ID mapping table 502 could be exhausted, for example, after 64 UDP or 64 TCP sessions. In such a case, there would not be any free PNIDs that the source node could allocate to a new session. In order to alleviate this problem, the destination node of the SA could assist by changing the SA when the number of simultaneous TCP (or UDP) sessions from the same source node that require identical ESP processing equals 64. Note that this is an implementation issue and does not violate the IPsec protocol. It should be noted that the larger the number of bits that are used for this purpose, the faster the SA refresh is required to be performed for the particular SA.

Once the source node of the SA has performed the mapping, it must notify intermediate nodes that need transport level information of such mapped values. Specifically, information organized in a manner similar to the tables illustrated in FIGS. 4a and b are provided to the intermediate nodes. The network points that need to be aware of such a mapped values include, for example: (1) a diff-serv marker node (2) a management metering node, or (3) a policy enforcement node (firewall). For a diff-serv marker node, the only node that needs to be notified is the node that is responsible for marking the packets that originate from the source node. For a policy enforcement node or firewall, it is likely that all firewalls that need to police the traffic need to be informed of the mapped values. Similarly, for a management metering node, all nodes that are interested in metering the traffic need to be aware of the mapped values. The specific mechanisms that the source node of the SA employs to deliver the mapped values to intermediate nodes can be of any type as described above including those that may become known to one skilled in the art.

Figure 5C:
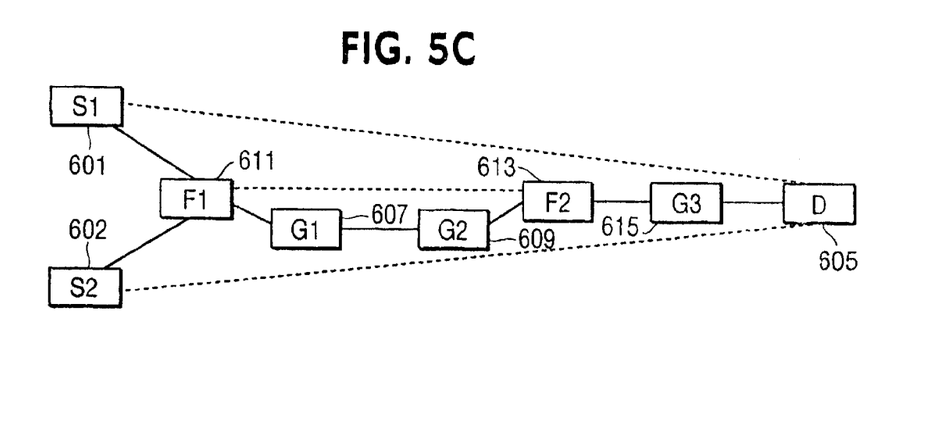

FIGS. 5a–c are schematic diagrams illustrating various modes of operation relative to the ESP protocol according to the present invention. The diagrams illustrated in FIGS. 5a–c are provided as examples of how the present invention operates in a packet switched system. Although the ESP protocol alone is used in the schematic diagrams illustrated in FIGS. 5a–c, other security protocols used along with ESP, particularly the AH protocol used with ESP would operate in a similar manner.

FIG. 5a illustrates a configuration where the ESP protocol is operated in the transport mode, and where source 1 (S1) 601 and source 2 (S2) 602 and destination (d) are sources and destinations of various SAs. Further, gateway (G1) 607 is an egress router and gateway (G2) 609 is an ingress router. First, a case will be considered where two UDP sessions are in existence between S1 601 and D 605, and one TCP session is in existence between S2 602 and D 605. In this case, it is assumed that the ESP protocol with the same algorithms, keys and other security parameters is desired for each of the three sessions. Since the number of simultaneous sessions using the same transport protocol (TCP/UDP) and requiring identical ESP protocol security processing (encryption algorithm, keys etc.) that originates at any single host and terminates at D 605 does not exceed 64, D may use the same SA for each of these sessions. The common SA for each of these three sessions is identified by the triple <D's IP address, ESP, SPI>, where SPI is a specific value for the SPI. In this establishment of SAs using the Internet Key Exchange (IKE), there does not exist a mechanism whereby the transport protocol (TCP/UDP) information is conveyed to the destination of the SA at the time of SA establishment. This then implies that one of two things may be done:

(1) Using the existing IKE mechanisms, the destination D 605 may use a common SA for a maximum of 64 simultaneous sessions originating from the same source (and terminating at D 605) which require identical ESP protocol security processing. This is independent of whether these sessions are UDP or TCP.

(2) The existing IKE mechanisms may be extended so that the destination D 605 is aware of the transport protocol of the session at the time of SA establishment. In such a case, the destination D 605 may use a common SA for a maximum of 64 simultaneous sessions originating from the same source (and terminating at D 605) which require identical ESP protocol security processing and which also use the same transport protocol (TCP/UDP).

Now assume that, for each of the three sessions, transport level information needs to be sent to the egress router G1

607 for marking purposes and the ingress router G2 607 for policing/metering purposes. Source S1 601 assigns an available TLID to each of the UDP sessions, where the leading two bits of the TLID are set to "01" (indicating UDP). Similarly, source S2 602 assigns an available TLID to the TCP session terminating at D 605 such that the leading two bits of the TLID are set to "10" (indicating TCP). These sessions are identified by the triple <(source) IP address, D's IP address, SPI, TLID>. Since the destination D 605 has ensured that not more than 64 simultaneous sessions (TCP & UDP combined with existing IKE; TCP or UDP with modified IKE) with the same ESP protocol security processing share the same SA, it is guaranteed that a TLID will be available at the source for assignment.

FIG. 5b illustrates a configuration where the ESP protocol is operated in the usage tunnel mode. In FIG. 5b, S1 601 and S2 602 are session sources and D 605 is the common destination. The sessions (from S1 601 and S2 602) pass through firewalls F1 611 and F2 613, as well as through G1 607 and G2 609. An SA exists between F1 611 and F2 613 while G1 607 and G2 609 (intermediate nodes) need transport level information for each of the sessions between S1 601 or S2 602 and D 605 for the purpose of packet marking or management metering.

First, a case is considered where two UDP sessions exist between S1 601 and D 605, and a TCP session exists between S2 602 and D 605. Packets from each of the three sessions flow through F1 611, G1 607, G2 609 and F2 613 before going on to D 605. Packets belonging to each of the three session are afforded the same ESP protocol security processing. In other words, the same ESP protocol security processing for the SA between established F1 611 and F2 613 is used for packets belonging to each of the three sessions.

The SA between F1 611 and F2 613 is uniquely identified by the triple <F2's IP address, ESP, SPI>. The conditions for the destination F2 613 of the SA to change the SA for identical ESP protocol security processings are as follows:

(1) Using the existing IKE mechanisms, the destination F2 613 of the SA may use a common SA for a maximum of 64 simultaneous sessions originating from F1 611 (and terminating at F2 613) which require identical ESP protocol security processing. This is independent of whether these sessions are UDP or TCP sessions and is also independent of the source (such as S1 601 and S2 602) that these sessions originate from.

(2) The existing IKE mechanisms may be extended so that the destination F2 613 of the SA is aware of the transport protocol of the session at the time of SA establishment. In such a case, the destination F2 613 may use a common SA for a maximum of 64 simultaneous sessions originating from the same F1 611 (and terminating at F2 613) which require identical ESP protocol security processings and which also use the same transport protocol (TCP/UDP).

(3) The existing IKE mechanisms may be further extended so that the destination F2 613 of the SA is aware of the session source (S1 601 or S2 602) at the time of SA establishment. In such a case, the destination F2 613 may use a common SA for a maximum of 64 simultaneous sessions originating from the same F1 611 (and terminating at F2 613) which require identical ESP protocol security processing, which use the same transport protocol (TCP/UDP) and which originate at the same source. This is used only when the session source is also needed by the intermediate node. Since the session source IP address is encrypted in the tunnel mode of the ESP protocol, and an intermediate node desires this information, then such information needs to be suitable mapped within the sequence number field or by other means.

After information related to the transport level information is stored in the sequence number field of the ESP protocol header, F1 611, then conveys the mapping tables to the intermediate nodes G1 607 and G2 609 that requires such transport level information to permit decoding of such information.

FIG. 5c illustrates a case involving a nested SA scenario. As seen in FIG. 5c, an end-to-end transport-mode ESP protocol SA exists between the session source (S1 601 or S2 602) and the session destination (D 605). In addition, this SA is nested within a tunnel mode ESP protocol SA existing between F1 611 and F2 613. In this case, destination D 605 determines whether a new SA should be created for sessions requiring identical ESP protocol security processing based on the conditions discussed for the case illustrated in FIG. 5a. In this case, however, the session sources pass on the mapping tables to the source of a first security gateway existing in F1 611, and not to the intermediate nodes (G1 607 and G2 609) that require transport level information. In addition, the mapping tables are passed on to any other intermediate nodes (such as G3 615) that are present beyond the termination of the nested SA. F2 613 determines whether a new SA needs to be created between F1 611 and F2 613 based on the conditions discussed in the case illustrated in FIG. 5b. F2 613 creates new mapping tables which are used to configure the bits of the leading byte of the sequence number field to represent the transport level information (protocol and port number). This is done in a similar fashion to that described in the case illustrated in FIG. 5b.

When a packet arrives at F1 611 from S1 601, F1 611 examines the leading byte of the sequence number field and based on the mapping tables that it received from S1 601, F1 611 determines the transport level information. Using mapping tables created by F1 611, F1 611 then inserts suitable values into the leading byte of the sequence number field of the outer ESP protocol header. At F2 613, the outer ESP protocol header is removed, and the transport mode ESP protocol packet is what flows between F2 613 and D 605.

The present invention as described above provides a mechanism by which transport level information can be conveyed to intermediate nodes in the presence of IPsec security protocols, particularly ESP protocol and AH protocol. The transport level information of importance here are the transport protocol (TCP/UDP/ICMP) and the port number. The mechanism was discussed for transport mode, tunnel mode and nested ESP protocol security processings. Using such mechanisms, intermediate nodes such as diffserv markers/classifiers, firewalls/policers as well as network management nodes can perform their respective functions. These nodes require such transport level information for their functioning.

While the present invention has been described in detail and pictorially in the accompanying drawings it is not limited to such details since many changes and modifications recognizable to those of ordinary skill in the art may be made to the invention without departing from the spirit and the scope thereof.

We claim:

1. A method of permitting access to selected information normally included in a payload of a packet upon which encrypting security processing has been performed by a node in a packet switched network during transmission of the packet to another node, said method comprising:

prior to performing encrypting security processing on a payload of a packet, storing information corresponding to selected information normally included in a payload of said packet in a field in a header of said packet where said field is not subject to said encrypting security processing, said selected information including transport level information, said transport level information being useable by at least one intermediate nodes between said node and said another node in the packet switched network to provide value added services relative to the transmission;

performing said encrypting security processing on said payload of said packet; and transmitting said packet including said header and said payload upon which encrypting security processing has been performed in the packet switched network, thereby permitting access to said selected information normally included in said payload of said packet via said header of said packet by a node in the packet switched network.

2. A method according claim 1, wherein said transport level information includes transport protocol information including Transmission Control Protocol (TCP), User Datagram Protocol (UDP), Internet Control Message Protocol (ICMP) or port number information.

3. A method according to claim 1, wherein said selected information is stored in a security protocol header of said header of said packet, said security protocol header not being subject to said encrypting security processing.

4. A method according to claim 3, wherein said selected information is stored in a sequence number field of said security protocol header of said packet.

5. A method according to claim 4, wherein said sequence number field is modified to include information representative of said selected information.

6. A method according to claim 5, wherein leading bits of said sequence number field are used to provide information related to transport level information of said packet and remaining bits of said sequence number field are used to provide information regarding a sequence number of said packet.

7. A method according to claim 6, wherein said transport level information includes a transport protocol ID identifying a particular transport protocol to be used and a port number ID identifying a particular port to be used.

8. A method according to claim 1, wherein said encrypting security processing is performed according to the Encapsulating Security Payload (ESP) protocol.

9. A method according to claim 1, wherein said encrypting security processing is performed according to the Authentication Header (AH) protocol.

10. A packet switched network comprising:
a network; and
a plurality of nodes interconnected to each other by said network to permit communication between said nodes using packets;
wherein at least one node transmits a packet to another node in a manner to permit access to selected information normally included in a payload of said packet upon which encrypting security processing has been performed during said transmission of said packet from said at least one node to said another node, said selected information including transport level information, said transport level information being useable by at least one intermediate nodes between said at least one node and said another node in the network to provide value added services relative to the transmission;

wherein the at least one node, prior to performing encrypting security processing on a payload of a packet, stores information corresponding to selected information normally included in a payload of said packet in a field in a header of said packet where said field is not subject to said encrypting security processing, performs said encrypting security processing on said payload of said packet, and transmits said packet including said header and said payload upon which encrypting security processing has been performed, thereby permitting access to said selected information normally included in said payload of said packet via said header of said packet during transmission of said packet from said at least one node to said another node.

11. A packet switched network according to claim 10, wherein said transport level information includes transport protocol information including Transmission Control Protocol (TCP), User Datagram Protocol (UDP), Internet Control Message Protocol (ICMP) or port number information.

12. A packet switched network according to claim 10, wherein said selected information is stored in a security protocol header of said header of said packet, said security protocol header not being subject to said encrypting security processing.

13. A packet switched network according to claim 12, wherein said selected information is stored in a sequence number field of said security protocol header of said packet.

14. A packet switched network according to claim 13, wherein said sequence number field is modified to include information representative of said selected information.

15. A packet switched network according to claim 14, wherein leading bits of said sequence number field are used to provide information related to transport level information of said packet and remaining bits of said sequence number field are used to provide information regarding a sequence number of said packet.

16. A packet switched network according to claim 15, wherein said transport level information includes a transport protocol ID identifying a particular transport protocol to be used and a port number ID identifying a particular port to be used.

17. A packet switched network according to claim 10, wherein said encrypting security processing is performed according to the Encapsulating Security Payload (ESP) protocol.

18. A packet switched network according to claim 10, wherein said encrypting security processing is performed according to the Authentication Header (AH) protocol.

19. A method of permitting access to selected information normally included in a payload of a packet upon which encrypting security processing has been performed by a node in a packet switched network during transmission of the packet to another node, said method comprising:
prior to performing encrypting security processing on a payload of a packet, storing information corresponding to selected information normally included in a payload of said packet in a field in a header of said packet where said field is not subject to said encrypting security processing, said selected information including transport level information, said transport level information being useable by at least one intermediate node between said node and said another node in the packet switched network to provide value added services relative to the transmission;

performing said encrypting security processing on said payload of said packet; and transmitting said packet including said header and said payload upon which encrypting security processing has been performed in the packet switched network, thereby permitting access to said selected information normally included in said payload of said packet via said header of said packet by a node in the packet switched network; and wherein said value added services comprise differentiated services.

20. A method of permitting access to selected information normally included in a payload of a packet upon which encrypting security processing has been performed by a node in a packet switched network during transmission of the packet to another node, said method comprising:

prior to performing encrypting security processing on a payload of a packet, storing information corresponding to selected information normally included in a payload of said packet in a field in a header of said packet where said field is not subject to said encrypting security processing, said selected information including transport level information, said transport level information being useable by at least one intermediate node between said node and said another node in the packet switched network to provide value added services relative to the transmission;

performing said encrypting security processing on said payload of said packet; and transmitting said packet including said header and said payload upon which encrypting security processing has been performed in the packet switched network, thereby permitting access to said selected information normally included in said payload of said packet via said header of said packet by a node in the packet switched network; and wherein said value added services comprise management of nodes for metering.

21. A method of permitting access to selected information normally included in a payload of a packet upon which encrypting security processing has been performed by a node in a packet switched network during transmission of the packet to another node, said method comprising:

prior to performing encrypting security processing on a payload of a packet, storing information corresponding to selected information normally included in a payload of said packet in a field in a header of said packet where said field is not subject to said encrypting security processing, said selected information including transport level information, said transport level information being useable by at least one intermediate node between said node and said another node in the packet switched network to provide value added services relative to the transmission;

performing said encrypting security processing on said payload of said packet; and transmitting said packet including said header and said payload upon which encrypting security processing has been performed in the packet switched network, thereby permitting access to said selected information normally included in said payload of said packet via said header of said packet by a node in the packet switched network; and wherein said value added services comprise policing of at least one of the nodes.

22. A packet switched network comprising:

a network; and a plurality of nodes interconnected to each other by said network to permit communication between said nodes using packets;

wherein at least one node transmits a packet to another node in a manner to permit access to selected information normally included in a payload of said packet upon which encrypting security processing has been performed during said transmission of said packet from said at least one node to said another node, said selected information including transport level information, said transport level information being useable by at least one intermediate node between said at least one node and said another node in the network to provide value added services relative to the transmission;

wherein the at least one node, prior to performing encrypting security processing on a payload of a packet, stores information corresponding to selected information normally included in a payload of said packet in a field in a header of said packet where said field is not subject to said encrypting security processing, performs said encrypting security processing on said payload of said packet, and transmits said packet including said header and said payload upon which encrypting security processing has been performed, thereby permitting access to said selected information normally included in said payload of said packet via said header of said packet during transmission of said packet from said node to said at least one another node; and wherein said value added services comprise differentiated services.

23. A packet switched network comprising:

a network; and a plurality of nodes interconnected to each other by said network to permit communication between said nodes using packets;

wherein at least one node transmits a packet to another node in a manner to permit access to selected information normally included in a payload of said packet upon which encrypting security processing has been performed during said transmission of said packet from said at last one node to said another node, said selected information including transport level information, said transport level information being useable by at least one intermediate node between said at least one node and said another node in the network to provide value added services relative to the transmission;

wherein the at least one node, prior to performing encrypting security processing on a payload of a packet, stores information corresponding to selected information normally included in a payload of said packet in a field in a header of said packet where said field is not subject to said encrypting security processing, performs said encrypting security processing on said payload of said packet, and transmits said packet including said header and said payload upon which encrypting security processing has been performed, thereby permitting access to said selected information normally included in said payload of said packet via said header of said packet during transmission of said packet from said node to said at least one another node; and wherein said value added services comprise policing of at least one of the nodes.

24. A packet switched network comprising:

a network; and a plurality of nodes interconnected to each other by said network to permit communication between said nodes using packets;

wherein the at least one node transmits a packet to another node in a manner to permit access to selected information normally included in a payload of said packet upon which encrypting security processing has been performed during said transmission of said packet from said at least one node to said another node, said selected information including transport level information, said transport level information being useable by at least one intermediate node between said at least one node and said another node in the network to provide value added services relative to the transmission;

wherein the at least one node, prior to performing encrypting security processing on a payload of a packet, stores information corresponding to selected information normally included in a payload of said packet in a field in a header of said packet where said field is not subject to said encrypting security processing, performs said encrypting security processing on said payload of said packet, and transmits said packet including said header and said payload upon which encrypting security processing has been performed, thereby permitting access to said selected information normally included in said payload of said packet via said header of said packet during transmission of said packet from said at least one node to said another node; and wherein said value added services comprise management of at least one node for metering.

* * * * *